(12) United States Patent
Kloc et al.

(10) Patent No.: US 11,356,540 B2
(45) Date of Patent: Jun. 7, 2022

(54) NODE/NETWORK AGGREGATION GATEWAY DEVICE

(71) Applicant: SCOTT TECHNOLOGIES, INC., Monroe, MN (US)

(72) Inventors: Longin James Kloc, Charlotte, NC (US); Michael Scott Sabolcik, Waxhaw, NC (US); Kimberly Michelle Henry, Charlotte, NC (US); Darin Kyle Thompson, Huntersville, NC (US); David M. Barbarine, Waxhaw, NC (US)

(73) Assignee: Scott Technologies, Inc., Monroe, NC (US)

( * ) Notice: Subject to any disclaimer, the term of this patent is extended or adjusted under 35 U.S.C. 154(b) by 296 days.

(21) Appl. No.: 16/093,759

(22) PCT Filed: Apr. 14, 2017

(86) PCT No.: PCT/US2017/027737
§ 371 (c)(1),
(2) Date: Oct. 15, 2018

(87) PCT Pub. No.: WO2017/181090
PCT Pub. Date: Oct. 19, 2017

(65) Prior Publication Data
US 2019/0124182 A1 Apr. 25, 2019

Related U.S. Application Data

(60) Provisional application No. 62/322,996, filed on Apr. 15, 2016.

(51) Int. Cl.
*H04L 69/08* (2022.01)
*H04L 67/565* (2022.01)
(Continued)

(52) U.S. Cl.
CPC .............. *H04L 69/08* (2013.01); *H04L 67/12* (2013.01); *H04L 67/2823* (2013.01); *H04W 4/80* (2018.02); *H04W 4/90* (2018.02)

(58) Field of Classification Search
CPC ... H04L 69/08; H04L 29/0617; H04L 69/329; H04L 67/12; H04L 67/2823;
(Continued)

(56) References Cited

U.S. PATENT DOCUMENTS 7,263,379 B1 * 8/2007 Parkulo .................. G08B 21/02
340/501
2011/0140913 A1 * 6/2011 Montenero ........ G08B 21/0233
340/870.07

(Continued)

FOREIGN PATENT DOCUMENTS

EP       2851832       3/2015
JP    2011180987 A    9/2011
(Continued)

OTHER PUBLICATIONS

Matteo Lanati, Davide Curone, Emanuele Lindo Secco, Giovanni Magenes and Paolo Gamba, An Autonomous Monitoring System for Emergency Operators, International Journal of Wireless & Mobile Networks, vol. 3, No. 1, pp. 10-23 (Year: 2011).*

(Continued)

*Primary Examiner* — Christopher M Crutchfield

(57) ABSTRACT

A method, gateway device, computer and computer to program product for monitoring responder interaction with equipment and credentialing of a responder are provides. A gateway device includes a memory and a processor. The memory is configured to store responder credentials and equipment data. The processor is in communication with the memory and is configured to translate equipment data received from equipment in a first format according to a first protocol to a second format according to a second protocol, (Continued)

the translated equipment data to be relayed to a computer. The processor is also configured to register equipment data in the memory. The gateway device also includes a transceiver configured to receive the equipment data from external equipment, transmit responder credentials to the computer and transmit the translated equipment data to the computer.

18 Claims, 5 Drawing Sheets

(51) Int. Cl.
  *H04L 67/12* (2022.01)
  *H04W 4/90* (2018.01)
  *H04W 4/80* (2018.01)
(58) Field of Classification Search
  CPC ........ H04L 67/306; H04L 67/26; H04W 4/18; H04W 12/16; H04W 84/18; H04W 4/70
  See application file for complete search history.

(56) References Cited

U.S. PATENT DOCUMENTS

| | | | |
|---|---|---|---|
| 2015/0088546 A1* | 3/2015 | Balram | G02B 27/0176 705/3 |
| 2015/0112883 A1 | 4/2015 | Orduna | |
| 2017/0064045 A1* | 3/2017 | Pai | H04L 69/08 |
| 2017/0289147 A1* | 10/2017 | Kyllonen | G06F 21/32 |

FOREIGN PATENT DOCUMENTS

| | | |
|---|---|---|
| JP | 2013217086 A | 10/2013 |
| JP | 2014060624 A2 | 4/2014 |
| KR | 20130107124 A | 10/2013 |

OTHER PUBLICATIONS

Ning Jia, Detecting Human Falls with a 3-Axis Digital Accelerometer, pp. 1-5 (Year: 2009).*
Davide Curone, Emanuele Lindo Secco, Alessandro Tognetti, Giannicola Loriga, Gabriela Dudnik, Michele Risatti, Rhys Whyte, Annalisa Bonfiglio, and Giovanni Magenes, Smart Garments for Emergency Operators: The ProeTEX Project, May 3, 2010 (Year: 2010).*
Author Unknown, Emergency Responder Health Monitoring and Surveillance, pp. 1-220 (Year: 2012).*
Saibal K Ghosh, Suryadip Chakraborty, Anagha Jamthe and Dharma P. Agrawal, Comprehensive Monitoring of Firefighters by a Wireless Body Area Sensor Network, pp. 1-6 (Year: 2013).*
M. Batalin, PHASER: Psychological Health Assessment System for Emergency Responders, pp. 1-6 (Year: 2013).*
Anthony Hamins, Nelson Bryner, Albert Jones, Galen Koepke, Casey Grant and Anand Raghunathan, Smart Firefighting Workshop Summary Report, pp. 1-103 (Year: 2014).*
International Search report on PCT International Application No. PCT/US2017/027737 dated Sep. 6, 2017, 4 pages.

* cited by examiner

NODE/NETWORK AGGREGATION GATEWAY DEVICE

CROSS REFERENCE TO RELATED APPLICATIONS

This application is a national stage filing under 35 U.S.C. 371 of PCT/US2017/027737, filed Apr. 14, 2017, which claims the benefit of U.S. Provisional Patent Application No. 62/322,996, filed Apr. 15, 2016, the disclosures of which are incorporated by reference in their entirety herein.

TECHNICAL FIELD

The present disclosure relates to wireless communications in a first responder environment, and in particular to tracking first responders and equipment usage.

BACKGROUND

Disasters and emergencies, whether natural or caused by man, are an unfortunate fact of life. Advance planning and preparation are key factors in dealing with such incidents. Preparedness relating to disasters and emergency incidents, particularly those which involve responders such as fire personnel, police, military, EMT/paramedics, doctors, nurses, and the like, plays a significant role in aiding positive outcomes during situations where first responders are called on to help.

Accountability for all responders at a headquarters, such as a fire station, and at a disaster or emergency site is a key concern for all incident commanders overseeing a group of responders. During an incident, emergency responders from various departments or agencies, such as fire, police, medical workers, federal agents, or even utility workers may become involved at the incident site. Some of these individuals may not possess the requisite devices or equipment to communicate with incident commanders or other supervisory personnel. Similarly, an incident commander often does not have the relevant information about responders from other departments or agencies who are involved in the incident. Thus, accountability may not be achieved for all responders.

An on-site commander often needs to know the number of responders on site, and what equipment they have and the state of that equipment, in order to properly staff the disaster and determine whether additional reinforcements must be called in. It is also important to know identifying factors about the responders on site, such as their position or rank, in order to establish a proper chain of command in dealing with the incident at hand.

SUMMARY

Some embodiments advantageously provide a method, gateway device, computer and computer program product for monitoring responder interaction with equipment and credentialing of a responder. According to one aspect, a gateway device is configured to be worn by a responder and to monitor interaction of the responder with equipment. The gateway device includes a memory and a processor. The memory is configured to store responder credentials and equipment data. The processor is in communication with the memory and is configured to translate equipment data received from equipment in a first format according to a first protocol to a second format according to a second protocol, the translated equipment data relayable to a computer. The processor is also configured to register equipment data in the memory. The gateway device also includes a transceiver configured to receive the equipment data from external equipment, transmit responder credentials to the computer and transmit the translated equipment data to the computer.

According to this aspect, in some embodiments, the transceiver includes circuitry to receive and transmit according to at least one of the following radio access technologies: Bluetooth®, cellular, wireless local area networks (WLAN), Zigbee®, and TycoNet™. In some embodiments, the computer hosts Service and Asset Management (SAM) software and the second format and second protocol are compatible with SAM software input requirements. In some embodiments, the equipment from which equipment data is translatable by the processor includes at least one of a handheld radio, a thermal imaging camera, an in-mask display, a console for a self-contained breathing apparatus (SCBA), and a personal distress unit (PDU). In some embodiments, the responder credentials include biometric data. In some embodiments, at least one of the equipment data and responder credentials are stored at a remote location. In some embodiments, the gateway device also includes an accelerometer to detect an acceleration of the gateway device exceeding a threshold to prompt the gateway device to communicate with the computer. In some embodiments, the gateway device further includes an operational status indicator. In some embodiments the operational status indicator gives a visual indication of signal strength of signals received from external equipment.

According to another aspect, a method in a gateway device configured to be worn by a responder and to monitor interaction of the responder with equipment is provided. The method includes storing responder credentials and equipment data. The method further includes translating equipment data received from equipment in a first format according to a first protocol to a second format according to a second protocol, the translated equipment data relayable to a computer. The method further includes receiving equipment data from external equipment, transmitting responder credentials to the computer and transmitting the translated equipment data to the computer.

According to this aspect, in some embodiments, the receiving and transmitting is according to at least one of the following radio access technologies: Bluetooth®, cellular, wireless local area networks (WLAN), Zigbee®, and TycoNet™. In some embodiments, the computer hosts Service and Asset Management (SAM) software and the second format and second protocol are compatible with SAM software input requirements. In some embodiments, the equipment from which equipment data is translatable includes at least one of a handheld radio, a thermal imaging camera, an in-mask display, a console for a self-contained breathing apparatus (SCBA), and a personal distress unit (PDU). In some embodiments, the responder credentials include biometric data. In some embodiments, at least one of the equipment data and responder credentials are stored at a remote location. In some embodiments, the method further includes detecting an acceleration of the gateway device exceeding a threshold to prompt the gateway device to communicate with the computer. In some embodiments, the method includes indicating an operational status of equipment. In some embodiments, indicating an operational status of the equipment includes giving a visual indication of signal strength of signals received from external equipment.

According to another aspect, a method in a computer for verifying responder credentials of a responder and correlating equipment data with the responder is provided. The method includes receiving responder credentials from a gateway device registered to a responder. The method further includes comparing the received responder credentials to stored responder credentials corresponding to the responder in order to verify the received responder credentials. The method further includes receiving equipment data from the gateway device and correlating the equipment data with the responder.

According to another aspect, a computer is configured to verify responder credentials of a responder and correlating equipment data with the responder. The computer includes a memory configured to store responder credentials and equipment data. The computer also includes a processor in communication with the memory and configured to receive responder credentials from a gateway device registered to a responder and compare the received responder credentials to stored responder credentials corresponding to the responder in order to verify the received responder credentials. The processor is also configured to receive equipment data from the gateway device and correlate the equipment data with the responder.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
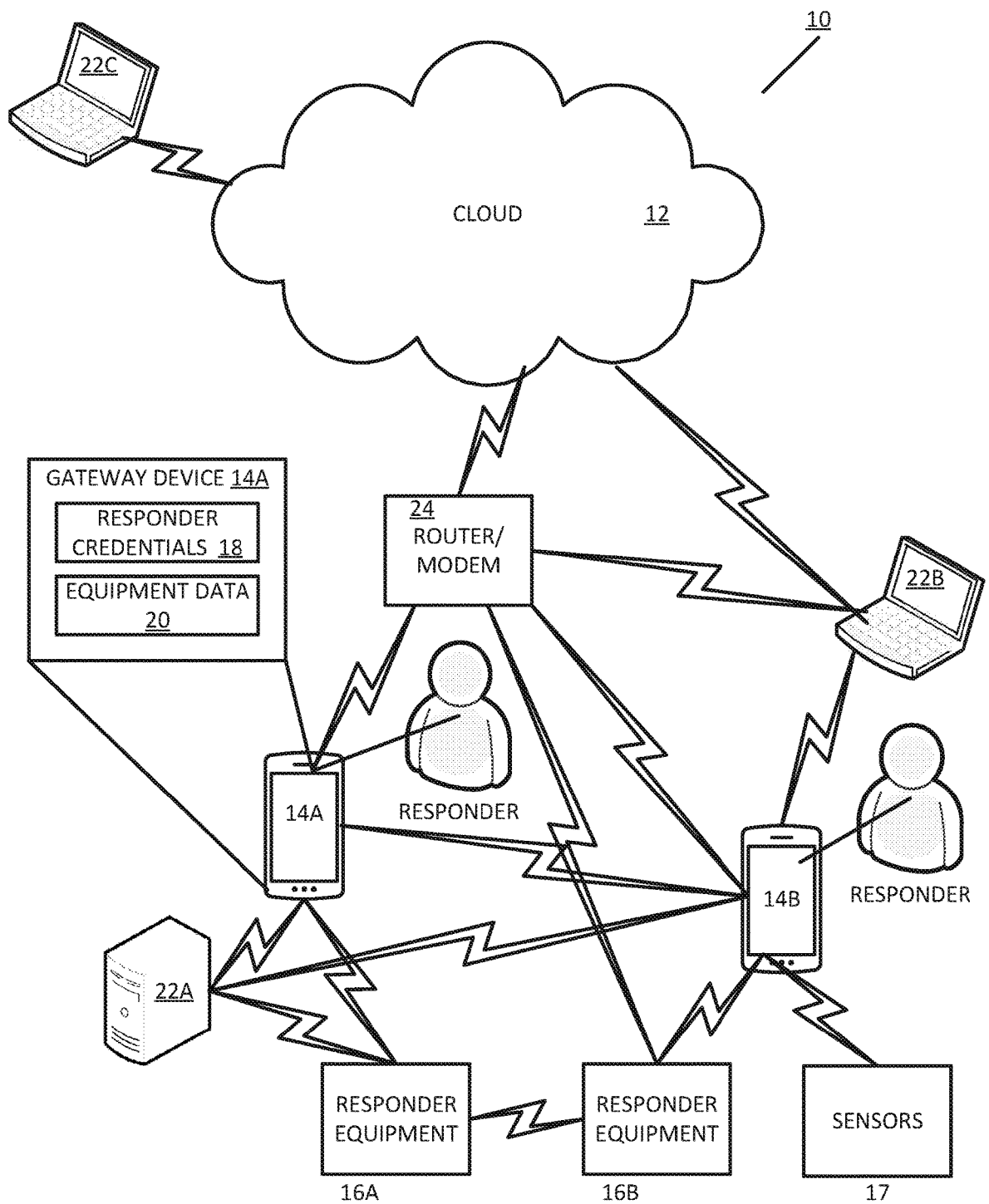
FIG. 1 is a block diagram of a wireless communication system configured according to principles set forth below.

Before describing in detail exemplary embodiments, it is noted that the embodiments reside primarily in combinations of apparatus components and processing steps related to tracking responders and equipment usage. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments include a node/network aggregation gateway device ("gateway device") for on-scene communications that includes a communication hub which translates communications and data from disparate devices on and/or used by the responder and transmits that information to interested participants or stakeholders such as an incident commander. Communication devices and equipment with which the gateway device may communicate include, for example, interpersonal communications devices such as the EPIC 3 Products for radio interface and talk around commercially provided by Scott Safety of Monroe, N.C., handheld radios, thermal imaging cameras, in-mask displays, gas detectors, consoles for self-contained breathing apparatus (SCBA) such as the Scott Safety Air Pak, Scott Safety® PDU (personal distress unit), personal alert safety system (PASS), BLUETOOTH lapel speaker microphone (BT-LSM), Scott EPIC Radio Interface (RI) & thermal imaging in-mask (TIM) (e.g., SCOTT SIGHT), smart devices, biometric devices and/or other data generating devices.

The gateway device communicates with a multitude of devices using wireless communication. Examples of radio access technologies for providing wireless communication may include BLUETOOTH networks, cellular networks, wireless local area networks (WLAN), ZIGBEE networks, TycoNet™ networks, or any other suitable means of wireless communication between devices. The gateway device may also include an RFID transmitter to transmit data to an RFID reader at a computer or other device.

The Internet of Things (IoT) is known in the art as the network of physical objects or "things" embedded with electronics, software, sensors, and network connectivity, which enables these objects to collect and exchange data across existing network infrastructure. In some embodiments, the gateway device may communicate with the physical objects, such as responder equipment, via the Internet.

The gateway device also carries a responder's personal information—herein referred to as responder credentials—so that these credentials can be captured by various other devices and software applications. An Incident Management component of the system tracks and places responders in assignments according to National Incident Management Standards (NIMS) using Incident Command Systems (ICS) Protocol.

FIG. 1 is a block diagram of a wireless communication network 10 configured in accordance with principles set forth herein. The wireless communication network 10 includes a cloud 12 which may include the Internet and/or the public switched telephone network (PSTN), as well as a mobile ad hoc network (MANET). Cloud 12 may also serve as a backhaul network of the wireless communication network 10. The wireless communication network 10 includes one or more gateway devices 14A and 14B, referred to collectively herein as gateway devices 14. Each gateway device 14 is associated with a responder, such as a first responder, and stores responder credentials 18 of the responder and also stores equipment data 20, such as equipment identifiers and status information. The gateway device 14 may be small such as about the size of a cell phone and worn or possessed by the responder as by attachment to clothing such as a belt, or kept in a pocket of the responder.

Each gateway device 14 may be configured to communicate with responder equipment 16A and 16B, referred to collectively herein as responder equipment 16. The responder equipment 16 may include at least one of a handheld radio, a thermal imaging camera, an in-mask display, a console for a self-contained breathing apparatus (SCBA), and a personal distress unit (PDU). The responder equipment may also include an emergency vehicle such as a fire engine. For example, the equipment may transmit an equipment identifier, a status or condition of the equipment, and a measurement by the equipment. This transmitted information may be received by the gateway device 14 in a first format according to a first protocol native to the equipment. The gateway device 14 may translate this information into a second format according to a second protocol understandable by a computer such as the computer 22A, 22B or 22C, referred to collectively herein as computers 22. Note that the computer 22 may be a wireless device.

A computer 22 may be installed at a central location such as a fire station or police station, or at a location that is proximal to a rescue scene, and may be used to monitor responders and their interactions with equipment. In particular, the computer 22 may host Service and Asset Management (SAM) software, where the second format and second protocol are compatible with SAM software input requirements. Also, the computer 22 may include a radio frequency identification (RFID) reader configured to read responder credentials 18 from the gateway device 14. Note that a gateway device 14 may communicate directly with a computer 22A or 22B or indirectly with a computer 2C via the cloud. The computer 22 may be a tower computer, laptop computer, I-PAD, another wireless device, etc. Note that the gateway devices 14A and 14B may directly communicate using a wireless communication technology. In this way, one gateway device, e.g., gateway device 14A, may determine its proximity to another gateway device, e.g., gateway device 14B, and may determine a strength of a signal from the other gateway device, e.g., gateway device 14B. In one embodiment, the proximity may be determined using a signal strength such as a BLUETOOTH signal strength.

In some embodiments, the computer 22 may be in direct communication with responder equipment 16, such as a fire truck, and may be in direct communication with the router or wireless modem 24 to connect to the cloud 12. In some embodiments, SAM software may be installed on the laptop computer 22B or 22C, which may provide local monitoring capabilities to monitor the gateway devices 14 and the responder equipment 16 to which they connect. Also, in some embodiments, some responder equipment 16 may communicate directly with other responder equipment 16. This may be done by wireline or wirelessly using Bluetooth, Wi-Fi, a personnel accountability system such as the Scott Electronic Management System (SEMS-2), native mobile radio technology or other radio access technology. Further, the gateway device 14 may also receive data from sensors 17 which may be installed in a smart building. This sensor data contributes to the equipment data 20 that the gateway device 14 relays to a central location such as computer 22A, 22B, or via the cloud 12, computer 22C.

Figure 2:
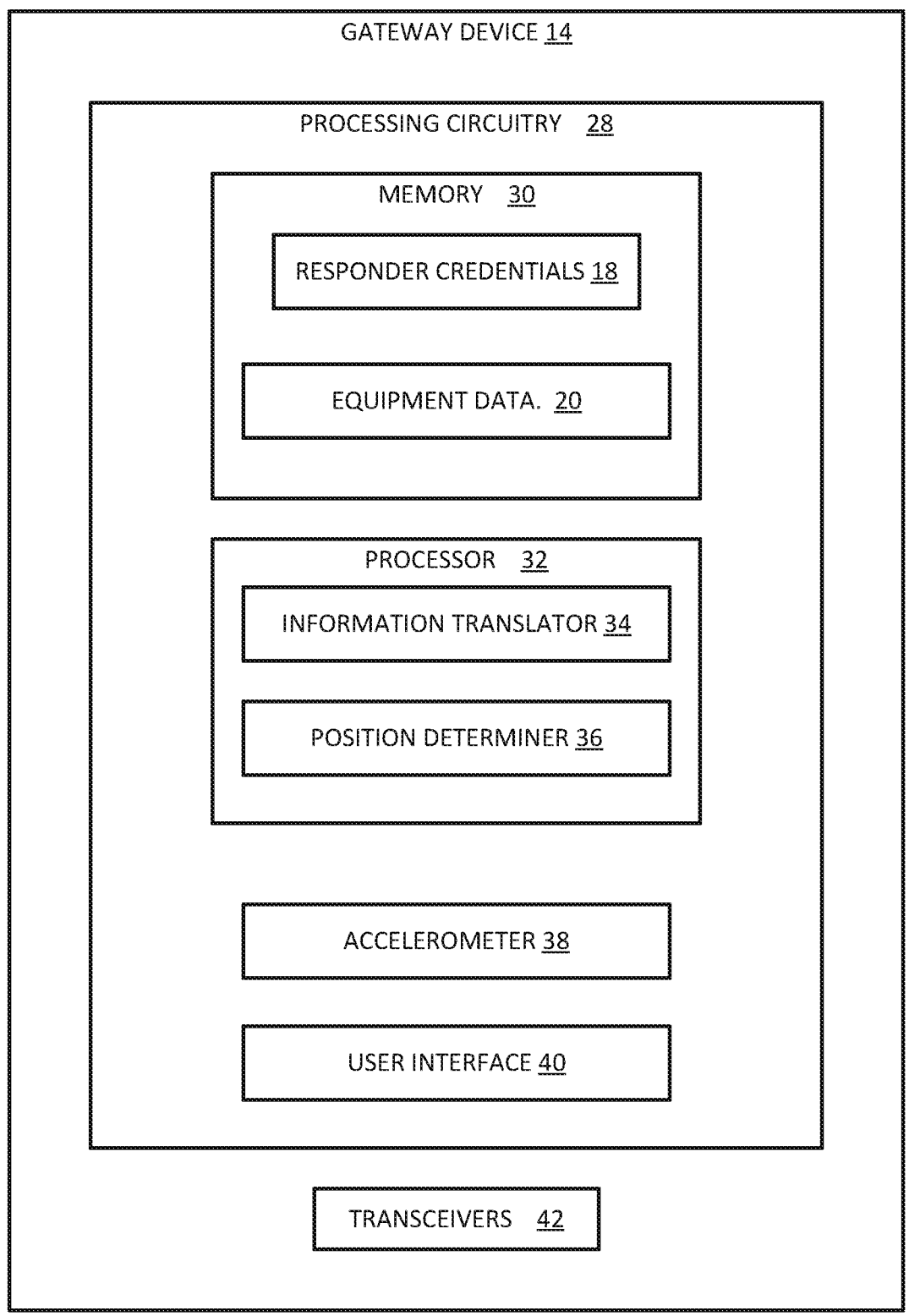
FIG. 2 is a block diagram of a gateway device configured according to principles set forth below.

FIG. 2 is a block diagram of a gateway device 14 constructed in accordance with principles set forth herein. The gateway device 14 includes processing circuitry 28. In some embodiments, the processing circuitry 28 may include a memory 30 and processor 32, the memory 30 containing instructions which, when executed by the processor 32, configure processor 32 to perform the one or more functions described herein. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry).

Processing circuitry 28 may include and/or be connected to and/or be configured for accessing (e.g., writing to and/or reading from) memory 30, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by control circuitry and/or other data, e.g., data pertaining to communication, e.g., configuration and/or address data of nodes, etc. Processing circuitry 28 may be configured to control any of the methods described herein and/or to cause such methods to be performed, e.g., by processor 32. Corresponding instructions may be stored in the memory 30, which may be readable and/or readably connected to the processing circuitry 28. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 28 includes or may be connected or connectable to memory, which may be configured to be accessible for reading and/or writing by the controller and/or processing circuitry 28.

The memory 30 is configured to store responder credentials 18 and equipment data 20. The responder credentials 18 may include a unique responder profile based on previously-entered individual responder data. The unique responder profile may include a unique personal identifier such as a unique code. The creation of a unique code corresponding to a particular responder may serve to ensure that certain sensitive biographical data (i.e. social security number, address, and the like) may not be immediately viewable by those viewing a user interface of the computer 22, while the responder is still accurately identified and accounted for in the computer 22 via the formulated code.

For instance, in one embodiment, biographical information of a responder is input into the computer 22 during an initial registration of the responder. This input may be performed manually or by scanning a driver license of the responder or by a device that records biometrics of the responder. This, information may be transferred from the computer 22 to the gateway device 14 for subsequent credentialing of the responder. In certain embodiments, the responder profile may optionally comprise other identifying information in addition to the unique code, such as the responder's first and last name, and biometric data such as eye color, iris pattern, fingerprint, blood type and genetic code. The responder profile may optionally be updated to include other identifying information, such as a photo or the like.

Equipment data 20 may include a unique identifier of each piece of equipment 16 worn and/or used by the responder to whom the gateway device 14 is assigned. The equipment data 20 may also include status information concerning a condition or state of the equipment 16. For example, equipment data 10 may include an indication of remaining power of an item of equipment. The equipment data 20 may also include a measurement made by an item of equipment 16 such as detection of a gas by a gas detector. Equipment data 20 may be received in one format and translated to a different format compatible with a communications protocol of the computer 22.

Thus, the processor 32 of the gateway device 14 may be programmed to implement an information translator 34. The information translator 34 is configured to translate equipment data 20 received from equipment 16 in a first format according to a first protocol to a second format according to a second protocol to be received by the computer 22.

The processor 32 may also be programmed to implement a position determiner 36 which determines the position of the gateway device 14. An accelerometer 38 is configured to detect a sudden acceleration followed by a sudden deceleration which occurs when a responder taps the gateway device 14 to trigger the gateway device 14 to transmit and/or receive equipment data 20 and/or transmit responder credentials 18. A magnitude of acceleration and/or deceleration may be compared to a threshold to determine if the intent by the responder is to trigger data transfer by the gateway device 14. The accelerometer can also be used to detect when the responder has potentially incurred an unintended action such as falling.

In some embodiments, the gateway device 14 also includes a user interface 40 such as a display, an interactive display, etc., to enable the user to view a state of the gateway device and may also indicate to the responder a state of the equipment used and/or worn by the responder.

The gateway device 14 includes at least one transceiver 42 to receive equipment data 20 from responder equipment 16 and to transmit responder credentials 18 and equipment data 20 to the computer 22 or to the router/wireless modem 24 and thence, to the cloud. Multiple transceivers 42 may be provided to enable communication via a plurality of radio access technologies. For example, one transceiver may be able to communicate with a piece of responder equipment via Bluetooth or Wi-Fi technology and another transceiver may be able to communicate with the wireless modem or directly with the Internet via a $3^{rd}$ Generation Partnership Project (3GPP) protocol such as 4G (long term evolution (LTE)) cellular technology. The LTE technology may also be used to receive data from other sensors 17 installed within a smart building. Data from these sensors 17 may also be forwarded to a central location such as the computer 22. In addition, the transceivers 42 may include a Global Positioning System (GPS) receiver. The gateway device 14 may also include other input elements (not shown) to allow the user to input credentials or allow an operator to program/configure the gateway device 14. In some embodiments, the user interface (40) of the gateway device 14 may have indicators, such as light emitting diodes (LEDs), and the like, to provide operational status indications to the user. Operational status indications may include, but are not limited to, battery level of the gateway device 14, communications establishment/strength with other devices such the computer 22 and or router wireless/modem 24, etc.

Figure 3:
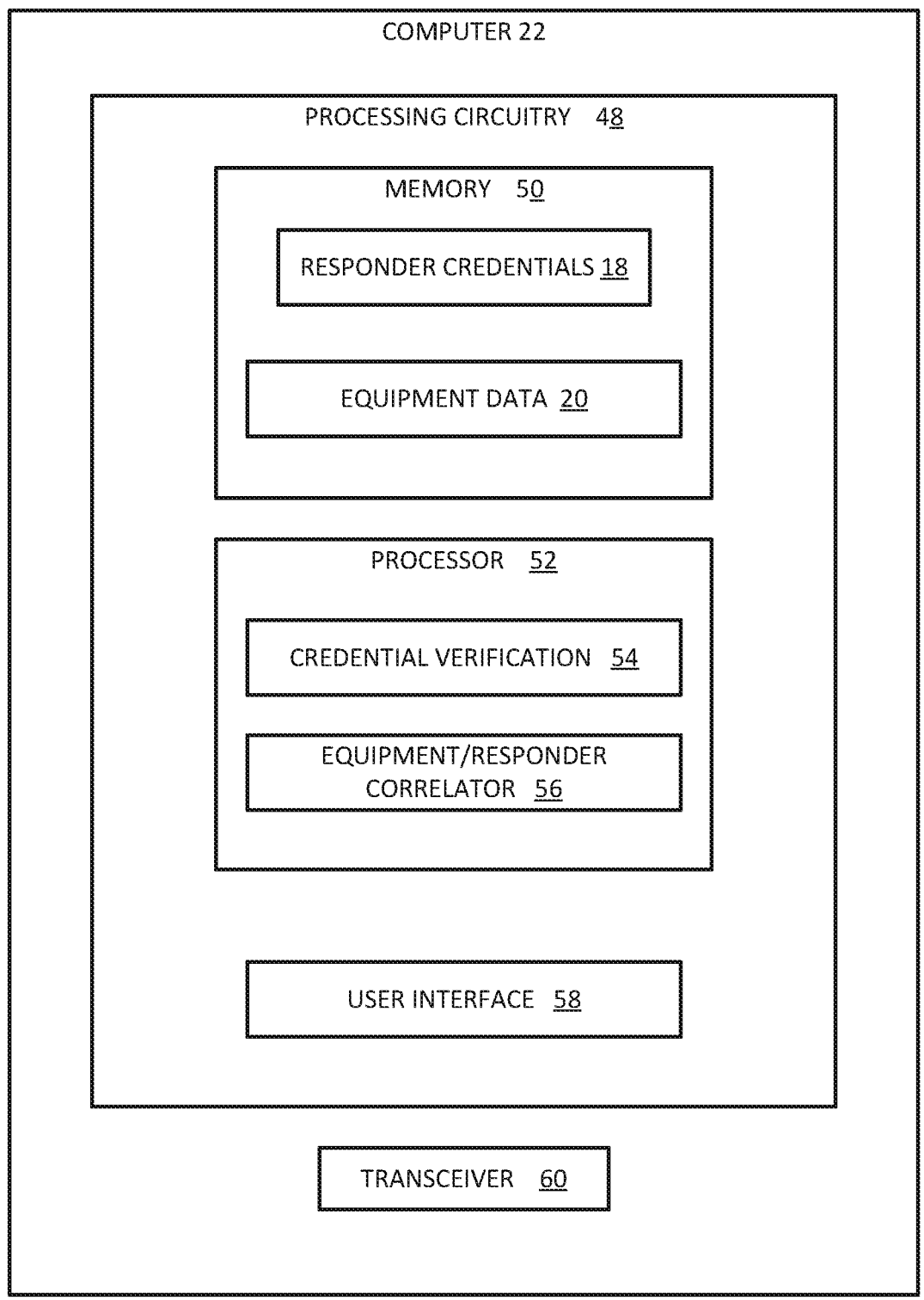
FIG. 3 is a block diagram of a computer configured according to principles set forth below.

FIG. 3 is a block diagram of a computer 22 configured to store and process responder credentials 18 and equipment data 20. The computer includes processing circuitry 48. In some embodiments, the processing circuitry 48 may include a memory 50 and processor 52, the memory 50 containing instructions which, when executed by the processor 52, configure processor 52 to perform the one or more functions described herein. In addition to a traditional processor and memory, processing circuitry 48 may comprise integrated circuitry for processing and/or control, e.g., one or more processors and/or processor cores and/or FPGAs (Field Programmable Gate Array) and/or ASICs (Application Specific Integrated Circuitry).

Processing circuitry 48 may include and/or be connected to and/or be configured for accessing (e.g., writing to and/or reading from) memory 50, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 50 may be configured to store code executable by control circuitry and/or other data, e.g., data pertaining to communication, e.g., configuration and/or address data of nodes, etc. Processing circuitry 48 may be configured to control any of the methods described herein and/or to cause such methods to be performed, e.g., by processor 52. Corresponding instructions may be stored in the memory 50, which may be readable and/or readably connected to the processing circuitry 48. In other words, processing circuitry 48 may include a controller, which may comprise a microprocessor and/or microcontroller and/or FPGA (Field-Programmable Gate Array) device and/or ASIC (Application Specific Integrated Circuit) device. It may be considered that processing circuitry 48 includes or may be connected or connectable to memory, which may be configured to be accessible for reading and/or writing by the controller and/or processing circuitry 48.

The memory 50 is configured to store responder credentials 18 and equipment data 20. The processor 52 is configured to implement credential verification 54 by receiving responder credentials from the gateway device 14 and comparing the received responder credentials to a set of responder credentials previously stored at the computer 22. This comparison may be triggered when the responder comes in proximity to the computer 22. The computer 22 may have an RFID configured to read the credentials wirelessly from the gateway device 14. If the stored responder credentials and the received responder credentials match, the computer 22 registers the responder as being on duty.

In some embodiments, the processor 48 implements an equipment/responder correlator 56 which associates in memory the equipment data 20 received from the gateway device 14 to the responder whose credentials have been verified.

The user interface 58 of the computer 22 enables a responder to cause the computer 22 to read the responder credentials 18 from the gateway device 14. In some embodiments, the gateway device 14 may transmit equipment data 20 periodically to the computer 22 or in response to a request transmitted wirelessly from the computer 22. The computer 22 stores the received equipment data 20 and may display the equipment data 20 via the user interface 58. Thus, the user interface 58 may include a video monitor that displays a graphical user interface.

The transceiver 60 receives the responder credentials 18 and equipment data 20 from the gateway device 14 according to the second protocol and in a second format transmitted by the gateway device 14, as explained above. For example, the transceiver 60 may include an RFID reader and/or a BLUETOOTH or Wi-Fi transceiver.

Figure 4:
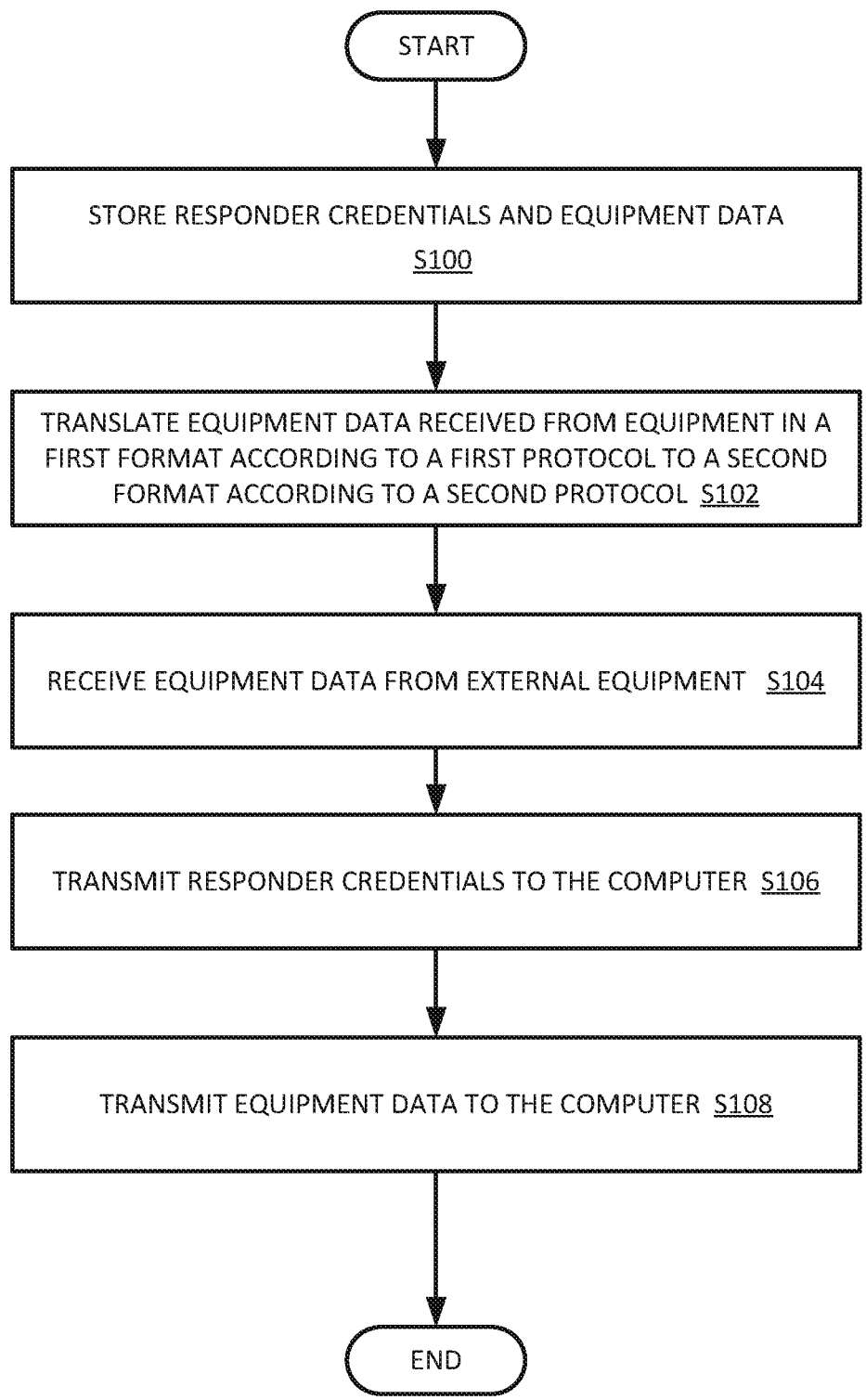
FIG. 4 is a flowchart of an exemplary process for monitoring responder interaction with equipment.

FIG. 4 is a flowchart of an exemplary process in a gateway device 14 for monitoring interaction of a responder with equipment 16. The process includes storing responder credentials 18 and equipment data 20 in the memory 30 (block S100). The process further includes translating, via the information translator 34, equipment data 20 received from equipment 16 in a first format according to a first protocol to a second format according to a second protocol understandable by a computer 22 (block S102). The process also includes receiving equipment data 20 from external equipment 16 (block S104), transmitting responder credentials 18 to the computer 22 (block S106) and transmitting equipment data 20 to the computer 22 (block S108).

Figure 5:
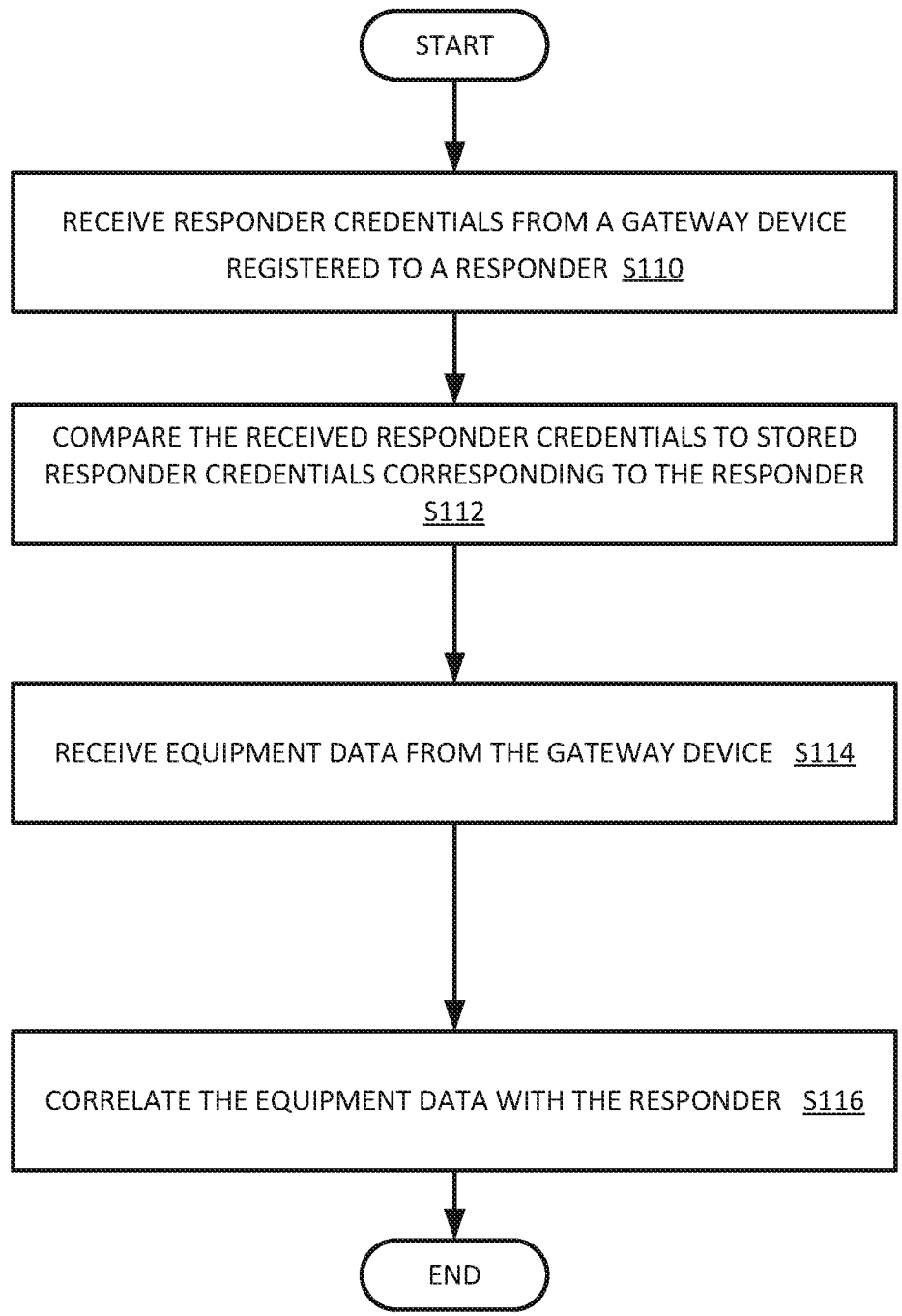
FIG. 5 is a flowchart of an exemplary process for verifying credentials of a responder and associating equipment data with the responder.

FIG. 5 is a flowchart of an exemplary process in a computer 22 for receiving and verifying responder credentials 18 and receiving and displaying equipment data 20. The process includes receiving, via the transceiver 60, responder credentials from a gateway device 14 registered to a responder (block S110). The process also includes implementing credential verification 54 by comparing the received responder credentials 18 to stored responder credentials corresponding to the responder (block S112) The process also includes receiving equipment data from the gateway device (block S114) and correlating, via the equipment/responder correlator 56, the equipment data 20 with the responder (block S116).

EXAMPLE

Firefighter Mike arrives for his shift at the fire station. Upon arriving at the station he retrieves his gateway device 14 from a charging base, the gateway device 14 already having recorded his responder credentials 18. He walks to the computer 22 and touches his gateway device 14 to an RFID reader in the computer 22. Staffing software loaded in the computer 22 reads his gateway device 14 and receiving Mike's responder credentials 18 from the gateway device 14, the computer 22 registers him as on duty. Mike places his gateway device 14 on his belt and begins his shift at the department.

While performing the inspection of his Air Pak, Mike taps his gateway device 14 to register into the Service and Asset Management (SAM) software of the computer 22. The responder credentials 18 received from the gateway device 14 allows the SAM to know that Mike Scott from Anytown Fire Department is the person doing the inspection on that particular Air Pak. Further, in some embodiments, the gateway device 14 receives equipment status data that is forwarded to the computer 22.

Shortly after Mike completes his inspection he is dispatched on an emergency call to respond to a structure fire. Mike quickly heads to the fire engine 16 and gets in the jump seat. An RFID reader or radio in the fire engine picks up on the signal from Mike's gateway device 14 and registers the fact that Mike is on board. In route to the incident, Mike begins to put on all his gear. Mike gets into his air pack and attaches his gateway device 14. The gateway device 14 gathers data from the equipment Mike wears and/or uses and relays this data to the computer 22 according to a protocol and format understandable by the computer 22.

Some embodiments advantageously provide a method, gateway device, computer and computer program product for monitoring responder interaction with equipment and credentialing of a responder. According to one aspect, a gateway device (14) is configured to be worn by a responder and to monitor interaction of the responder with equipment. The gateway device (14) includes a memory (30) and a processor (32). The memory (30) is configured to store responder credentials (18) and equipment data (20). The processor (32) is in communication with the memory (30) and is configured to translate equipment data received from equipment in a first format according to a first protocol to a second format according to a second protocol, the translated equipment data relayable to a computer (22). The processor (32) is also configured to register equipment data in the memory (30). The gateway device (14) also includes a transceiver (42) configured to receive the equipment data (20) from external equipment, transmit responder credentials (18) to the computer (22) and transmit the translated equipment data to the computer (22).

According to this aspect, in some embodiments, the transceiver (42) includes circuitry to receive and transmit according to at least one of the following radio access technologies: Bluetooth®, cellular, wireless local area networks (WLAN), Zigbee®, and TycoNet™. In some embodiments, the computer (22) hosts Service and Asset Management (SAM) software and the second format and second protocol are compatible with SAM software input requirements. In some embodiments, the equipment from which equipment data (20) is translatable by the processor (32) includes at least one of a handheld radio, a thermal imaging camera, an in-mask display, a console for a self-contained breathing apparatus (SCBA), and a personal distress unit (PDU). In some embodiments, the responder credentials (18) include biometric data. In some embodiments, at least one of the equipment data (20) and responder credentials (18) are stored at a remote location. In some embodiments, the gateway device (14) also includes an accelerometer (38) to detect an acceleration of the gateway device (14) exceeding a threshold to prompt the gateway device (14) to communicate with the computer (22). In some embodiments, the gateway device (14) further includes an operational status indicator (40). In some embodiments the operational status indicator (40) gives a visual indication of signal strength of signals received from external equipment.

According to another aspect, a method in a gateway device (14) configured to be worn by a responder and to monitor interaction of the responder with equipment is provided. The method includes storing responder credentials (18) and equipment data (20). The method further includes translating equipment data (20) received from equipment in a first format according to a first protocol to a second format according to a second protocol, the translated equipment data relayable to a computer (22). The method further includes receiving equipment data (20) from external equipment, transmitting responder credentials (18) to the computer and transmitting the translated equipment data to the computer (22).

According to this aspect, in some embodiments, the receiving and transmitting is according to at least one of the following radio access technologies: Bluetooth®, cellular, wireless local area networks (WLAN), Zigbee®, and TycoNet™. In some embodiments, the computer hosts Service and Asset Management (SAM) software and the second format and second protocol are compatible with SAM software input requirements. In some embodiments, the equipment from which equipment data (20) is translatable includes at least one of a handheld radio, a thermal imaging camera, an in-mask display, a console for a self-contained breathing apparatus (SCBA), and a personal distress unit (PDU). In some embodiments, the responder credentials (18) include biometric data. In some embodiments, at least one of the equipment data (20) and responder credentials (18) are stored at a remote location. In some embodiments, the method further includes detecting an acceleration of the gateway device exceeding a threshold to prompt the gateway device (14) to communicate with the computer (22). In some embodiments, the method includes indicating an operational status of equipment. In some embodiments, indicating an operational status of the equipment includes giving a visual indication of signal strength of signals received from external equipment.

According to another aspect, a method in a computer (22) for verifying responder credentials (18) of a responder and correlating equipment data (20) with the responder is provided. The method includes receiving responder credentials (18) from a gateway device (14) registered to a responder. The method further includes comparing the received responder credentials (18) to stored responder credentials corresponding to the responder in order to verify the received responder credentials (18). The method further includes receiving equipment data (20) from the gateway device (14) and correlating the equipment data (20) with the responder.

According to another aspect, a computer (22) is configured to verify responder credentials (18) of a responder and correlate equipment data (20) with the responder. The computer (22) includes a memory (50) configured to store responder credentials (18) and equipment data (20). The computer (22) also includes a processor (52) in communication with the memory (50) and configured to receive responder credentials (18) from a gateway device (14) registered to a responder and compare the received responder credentials (18) to stored responder credentials corresponding to the responder in order to verify the received responder credentials. The processor (52) is also configured to receive equipment data (20) from the gateway device (14) and correlate the equipment data (20) with the responder.

Thus, some embodiments provide a convenient way to monitor the presence of responders and their interaction with equipment, enabling an onsite commander to track who is on site and with what equipment each responders is equipped, as well as a status of that equipment and measurement data from that equipment. Further, some embodiments provide the advantage of translating equipment data (20) from a format native to a radio access technology of the equipment to a format native to a radio access technology of a computer (22) at a central or remote location. Advantages also include providing the responder a status in one display of a plurality of equipment items he or she is wearing or using.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A gateway device configured to be worn by a responder and to monitor interaction of the responder with equipment, the gateway device comprising:
    a memory configured to store:
        responder credentials; and
        equipment data;
    a processor in communication with the memory and configured to:
        translate equipment data received from equipment in a first format according to a first protocol to a second format according to a second protocol, the translated equipment data relayable to a computer; and
        register equipment data in the memory; and
    a transceiver configured to:
        receive equipment data from external equipment interacting with the responder, the equipment data comprising an equipment identifier that identifies the external equipment interacting with the responder;

transmit responder credentials associated with the responder interacting with the external equipment to the computer;

transmit translated equipment data from the external equipment interacting with the responder associated with the responder credentials to the computer, the translated equipment data comprising the equipment identifier that identifies the external equipment interacting with the responder; and an accelerometer configured to:
  detect an acceleration of the gateway device exceeding a first threshold;
  detect a deceleration of the gateway device exceeding a second threshold; and
  cause the gateway device to communicate the translated equipment data to the computer in response to detecting the acceleration exceeding the first threshold and subsequently detecting the deceleration exceeding the second threshold.

2. The gateway device of claim 1, wherein the transceiver includes circuitry to receive and transmit according to at least one of the following radio access technologies: Bluetooth®, cellular, wireless local area networks (WLAN), Zigbee®, and TycoNet™.

3. The gateway device of claim 1, wherein the computer hosts Service and Asset Management (SAM) software and the second format and second protocol are compatible with SAM software input requirements.

4. The gateway device of claim 1, wherein the equipment from which equipment data is translatable by the processor includes at least one of a handheld radio, a thermal imaging camera, an in-mask display, a console for a self-contained breathing apparatus (SCBA), and a personal distress unit (PDU).

5. The gateway device of claim 1, wherein the responder credentials include biometric data.

6. The gateway device of claim 1, wherein at least one of the equipment data and responder credentials are stored at a remote location.

7. The gateway device of claim 1, further comprising an operational status indicator.

8. The gateway device of claim 7, wherein the operational status indicator gives a visual indication of signal strength of signals received from external equipment.

9. A method in a gateway device configured to be worn by a responder and to monitor interaction of the responder with equipment, the method comprising:
  storing responder credentials and equipment data;
  translating equipment data received from equipment in a first format according to a first protocol to a second format according to a second protocol, the translated equipment data relayable to a computer;
  receiving equipment data from external equipment interacting with the responder, the equipment data comprising an equipment identifier that identifies the external equipment interacting with the responder;
  transmitting responder credentials associated with the responder interacting with the external equipment to the computer;
  transmitting translated equipment data from the external equipment interacting with the responder associated with the responder credentials to the computer, the translated equipment data comprising the equipment identifier that identifies the external equipment interacting with the responder;
  detecting, by an accelerometer in the gateway device, an acceleration of the gateway device exceeding a first threshold;
  detecting, by the accelerometer, a deceleration of the gateway device exceeding a second threshold; and
  communicating the translated equipment data to the computer in response to detecting the acceleration exceeding the first threshold and subsequently detecting the deceleration exceeding the second threshold.

10. The method of claim 9, wherein the receiving and transmitting is according to at least one of the following radio access technologies: Bluetooth®, cellular, wireless local area networks (WLAN), Zigbee®, and TycoNet™.

11. The method of claim 9, wherein the computer hosts Service and Asset Management (SAM) software and the second format and second protocol are compatible with SAM software input requirements.

12. The method of claim 10, wherein the equipment from which equipment data is translatable includes at least one of a handheld radio, a thermal imaging camera, an in-mask display, a console for a self-contained breathing apparatus (SCBA), and a personal distress unit (PDU).

13. The method of claim 9, wherein the responder credentials include biometric data.

14. The method of claim 9 wherein at least one of the equipment data and responder credentials are stored at a remote location.

15. The method of claim 9, further comprising indicating an operational status of equipment.

16. The method of claim 15, wherein indicating an operational status of the equipment includes giving a visual indication of signal strength of signals received from external equipment.

17. A method in a computer for verifying responder credentials of a responder and correlating translated equipment data with the responder, the method comprising:
  receiving responder credentials from a gateway device registered to a responder;
  comparing the received responder credentials to stored responder credentials corresponding to the responder in order to verify the received responder credentials;
  receiving translated equipment data from the gateway device, the translated equipment data comprising an equipment identifier that identifies external equipment interacting with the responder, the translated equipment data being:
    based on equipment data received by the gateway device from the external equipment interacting with the responder associated with the responder credentials; and
    associated with the gateway device detecting an acceleration exceeding a first threshold and subsequently detecting a deceleration exceeding a second threshold; and
  correlating the translated equipment data with the responder.

18. A computer configured to verify responder credentials of a responder and correlate translated equipment data with the responder, the computer comprising:
  a memory configured to store:
    responder credentials; and
    translated equipment data; and
  a processor in communication with the memory and configured to:
    receive responder credentials from a gateway device registered to a responder;

compare the received responder credentials to stored responder credentials corresponding to the responder in order to verify the received responder credentials;

receive translated equipment data from the gateway device, the translated equipment data comprising an equipment identifier that identifies external equipment interacting with the responder, the translated equipment data being:

based on equipment data received by the gateway device from the external equipment interacting with the responder associated with the responder credentials; and associated with the gateway device detecting an acceleration exceeding a first threshold and subsequently detecting a deceleration exceeding a second threshold; and correlate the translated equipment data with the responder.

\* \* \* \* \*